(12) United States Patent
Tardo et al.

(10) Patent No.: US 7,941,662 B2
(45) Date of Patent: May 10, 2011

(54) DATA TRANSFER EFFICIENCY IN A CRYPTOGRAPHY ACCELERATOR SYSTEM

(75) Inventors: Joseph Tardo, Palo Alto, CA (US); Mark Buer, Gilbert, AZ (US)

(73) Assignee: Broadcom Corporation, Irvine, CA (US)

( * ) Notice: Subject to any disclaimer, the term of this patent is extended or adjusted under 35 U.S.C. 154(b) by 860 days.

(21) Appl. No.: 10/161,475

(22) Filed: May 31, 2002

(65) Prior Publication Data

US 2003/0226018 A1    Dec. 4, 2003

(51) Int. Cl.
*H04L 9/32* (2006.01)
(52) U.S. Cl. ......... 713/168; 713/160; 713/164; 713/167
(58) Field of Classification Search ............... 380/255
See application file for complete search history.

(56) References Cited

U.S. PATENT DOCUMENTS

| | | | | |
|---|---|---|---|---|
| 5,161,193 | A * | 11/1992 | Lampson et al. | 713/151 |
| 5,546,463 | A * | 8/1996 | Caputo et al. | 713/159 |
| 5,557,346 | A * | 9/1996 | Lipner et al. | 380/286 |
| 5,745,573 | A * | 4/1998 | Lipner et al. | 380/286 |
| 5,946,399 | A * | 8/1999 | Kitaj et al. | 713/189 |
| 6,434,699 | B1 * | 8/2002 | Jones et al. | 713/168 |
| 6,625,689 | B2 * | 9/2003 | Narad et al. | 711/110 |
| 2005/0213762 | A1 * | 9/2005 | Hyland | 380/255 |
| 2005/0216726 | A1 * | 9/2005 | Dellmo et al. | 713/151 |
| 2005/0216734 | A1 * | 9/2005 | Yancy et al. | 713/160 |
| 2006/0014522 | A1 * | 1/2006 | Krischer et al. | 455/410 |

FOREIGN PATENT DOCUMENTS

EP    1580922 A2 *    9/2005

* cited by examiner

*Primary Examiner* — Pramila Parthasarathy
(74) *Attorney, Agent, or Firm* — Sterne Kessler Goldstein & Fox, P.L.L.C.

(57) ABSTRACT

Methods and apparatus are provided for performing authentication and decryption operations in a cryptography accelerator system. Input data passed to a cryptography accelerator from a host such a CPU includes information for a cryptography accelerator to determine where to write the processed data. In one example, processed data is formatted as packet payloads in a network buffer. Checksum information is pre-calculated and an offset for a header is maintained.

39 Claims, 7 Drawing Sheets

DATA TRANSFER EFFICIENCY IN A CRYPTOGRAPHY ACCELERATOR SYSTEM

BACKGROUND OF THE INVENTION

1. Field of the Invention

The present application relates to cryptography operations. More specifically, the present application relates to methods and apparatus for improving data transfer efficiency in a cryptography accelerator system used to process network protocol data.

2. Description of Related Art

Conventional software and hardware designs for performing decryption and authentication operations are inefficient. Some techniques for performing authentication and encryption use a CPU extensively to perform cryptographic operations. When a device such as a network card receives data, a CPU performs decryption and authentication operations on the data after the data is passed from the network card to the CPU. Another technique for performing authentication and decryption entails having a host such as a CPU issue function calls to a cryptography accelerator to perform specific cryptographic operations. However, having a host transfer data to a cryptography accelerator and having a cryptography accelerator transfer data to a host entails even more read, write, load, and store type operations.

Having a large number of read, write, load, and store type system bus operations significantly hinders performance in cryptography accelerator systems. Furthermore, having multiple components also leads to data being read and reread multiple times.

Software, firmware and hardware techniques for performing decryption and authentication operations, such as DES, AES, RC4, MD5 and SHA1 operations used in secured sessions have been inefficient and resource intensive. Secured sessions, authentication operations, and decryption algorithms are described in Applied Cryptography, Bruce Schneier, John Wiley & Sons, Inc. (ISBN 0471128457), incorporated by reference in its entirety for all purposes.

It is therefore desirable to provide methods and apparatus for improving decryption and authentication processing with respect to some or all of the performance limitations noted above.

SUMMARY OF THE INVENTION

Methods and apparatus are provided for performing authentication and decryption operations in a cryptography accelerator system. Input data passed to a cryptography accelerator from a host such a CPU includes information for a cryptography accelerator to determine where to write the processed data. In one example, processed data is formatted into one or more packet payloads in network buffers. Checksum information required by a network protocol is precalculated and an offset for a header is maintained.

According to various embodiments, a method for transferring data in a cryptography accelerator system is provided. An input message is read at a cryptography accelerator from a host coupled to the cryptography accelerator and a network device. The input message includes data and application descriptor information. The cryptography accelerator, the network device, and the host are operable to access a shared system memory. Cryptographic operations are performed on the data to derive processed data. The processed data is separated into a plurality of segments. The plurality of segments are written into a buffer pool associated with the network device. The cryptography accelerator uses the application descriptor information to determine where to write each of the plurality of segments in the buffer pool associated with the network device.

According to other embodiments, a system for performing cryptographic operations in a network is provided. The system includes system memory, a host, a network device, and a cryptography accelerator. System memory includes a plurality of buffer pools. The host is coupled to system memory. The host is configured to provide data for cryptography processing. A network device is operable to transmit a packet including cryptographically processed data onto the network. A cryptography accelerator is configured to perform cryptography processing to provide processed data. The processed data is written into a buffer pool associated with a network device. The packet includes a payload substantially written by the cryptography accelerator and header substantially written by the host.

According to still other embodiments, a cryptography accelerator is provided. The cryptography accelerator is configured to receive data from a central processing unit over a system bus. The data includes information for determining a plurality of memory locations associated with a network device buffer pool. The cryptography accelerator is operable to perform cryptographic processing to derive processed data and is further operable to write segments of the processed data to the plurality of memory locations.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

The present application relates to implementing a cryptography accelerator system. More specifically, the present application relates to methods and apparatus for improving data transfer efficiency in a cryptography accelerator system.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of a cryptography accelerator writing processed data to a network buffer. However, it should be noted that the techniques of the present invention can be applied to a variety of different buffer pools and component types. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
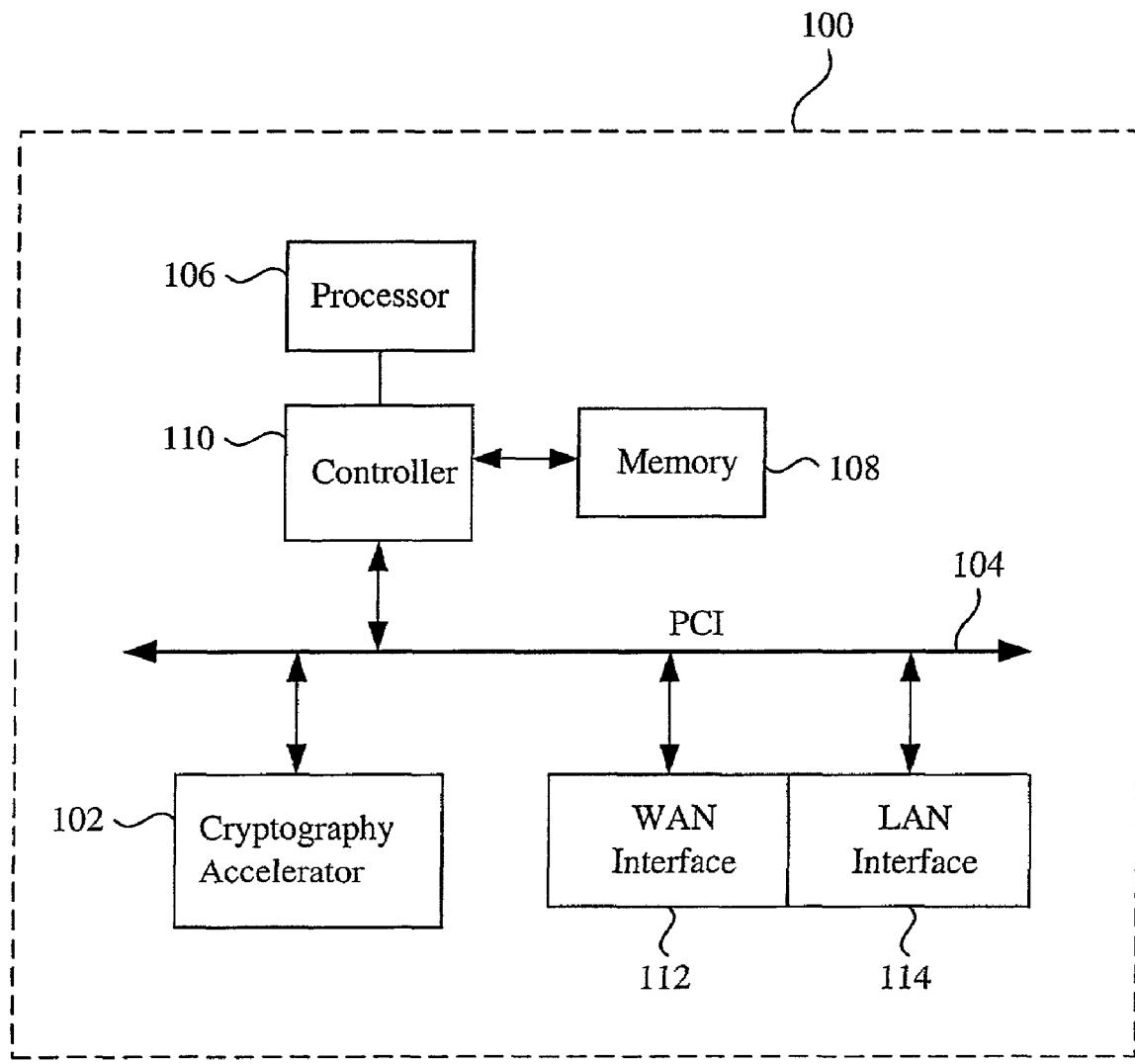
FIG. 1 is a diagrammatic representation of a system that can use the techniques of the present invention.

FIG. 1 is a diagrammatic representation of one example of a processing system 100 in accordance with an embodiment of the present invention. As shown in FIG. 1, the present invention may be implemented in a stand-alone cryptography accelerator 102 or as part of the system 100. Any logic, mechanism, or device operable to perform encryption, decryption, and/or authentication operations is referred to herein as a cryptography accelerator. In the described embodiment, the cryptography accelerator 102 is connected to a bus 104 such as a PCI bus via a standard on-chip PCI interface. The processing system 100 includes a processing unit 106 and a system memory unit 108. The processing unit 106 and the system memory unit 108 are coupled to the system bus 104 via a bridge and memory controller 110.

Although the processing unit 106 may be the central processing unit (CPU) of a system 100, it does not necessarily have to be the CPU. It can be one of a variety of processors in a multiprocessor system. In one example, a LAN interface 114 is provided to couple the processing system 100 to a local area network (LAN) to allow packet receipt and transmission. Similarly, a Wide Area Network (WAN) interface 112 can also be provided to connect the processing system to a WAN (not shown) such as the Internet. The WAN interface manages in-bound and out-bound packets to allow automatic decryption and authentication processing.

According to various embodiments, the cryptography accelerator 102 is an application specific integrated circuit (ASIC) coupled to the processor 106. The cryptography accelerator 102 can also be a programmable logic device (PLD), field programmable gate array (FPGA), or other device coupled to the processor 106. According to specific embodiments, the cryptography accelerator 102 is implemented either on a card connected to the bus 104 or as a standalone chip integrated in the system 100.

In other embodiments, the cryptography accelerator 102 itself is integrated into the processing core of a CPU of system 100, such as that available from Tensilica Corporation of Santa Clara, Calif. or MIPS Technologies of Mountain View, Calif. In another embodiment, techniques and mechanisms of the present invention are integrated into a CPU such as a CPU available from Intel Corporation of San Jose, Calif. or AMD Corporation of Sunnyvale, Calif. By implementing cryptography accelerator functionality entirely on the processor 106, a separate card or chip in the system 100 is not needed. In still other embodiments, the processing system 100 including the cryptography accelerator 102 is implemented as a system on a chip (SOC). The network interfaces, memory, processing core, and cryptography accelerator functionality are provided on a single integrated circuit device.

The cryptography accelerator 102 is capable of implementing various network security standards, such as Secure Sockets Layer/Transport Layer Security (SSL/TLS), which provide application-transparent encryption and authentication services for network traffic.

Network security standards such as SSL/TLS provide authentication through the use of hash algorithms and encryption through the use of encryption algorithms. Two commonly used hash algorithms are MD5 and the Secure Hash algorithm (SHA1). Other hash algorithms such as MD4 and MD2 are also available. Three commonly used encryption algorithms are DES, AES, and RC4. Other encryption algorithms such as triple DES are also available. Authentication and encryption algorithms are described in Applied Cryptography, Bruce Schneier, John Wiley & Sons, Inc. (ISBN 0471128457), incorporated by reference in its entirety for all purposes. Even though many network security standards apply the same hash algorithms, different approaches are taken toward applying the hash algorithms to the actual authentication computation.

Protocols such as SSL specify performing operations to derive keys for data exchange, generate messages for key and data exchange verification, process records, etc. In typical implementations, performing operations for secured sessions entails making various functional calls to a cryptography accelerator. In various embodiments, a processor such as a CPU implements software code for cryptography operations. The CPU periodically issues function calls to the cryptography accelerator to perform specific operations, such as DES processing, for example. Performing cryptography operations using the specialized cryptography accelerator typically improves the efficiency of cryptography processing.

However, issuing function calls to a cryptography accelerator is not without cost. In order to process data in a cryptography accelerator, data is generally copied from the memory space of the CPU application to the memory space that can be directly read by the cryptography accelerator. Various bus, memory, and interface resources are consumed during various data transfers. Context information for cryptography processing in the cryptography accelerator is also loaded and reloaded when the cryptography accelerator is called. Factors such as copying and loading reduce system efficiency and complicate software development.

According to various embodiments of the present invention, techniques are applied to reduce the need to copy data from one buffer pool to another buffer pool. A portion of system memory identified as a specific type of memory such as network memory, kernel memory, or process page memory, is referred to herein as a buffer pool. Buffer pools do not necessarily have to be contiguous portions of system memory. Instead of using a large number of reads, writes, loads, and stores to transfer cryptographically processed data to various components in a system, a reduced number of operations is used to reduce the amount of bus traffic, make possible highly efficient system designs, and simplify software development.

Figure 2:
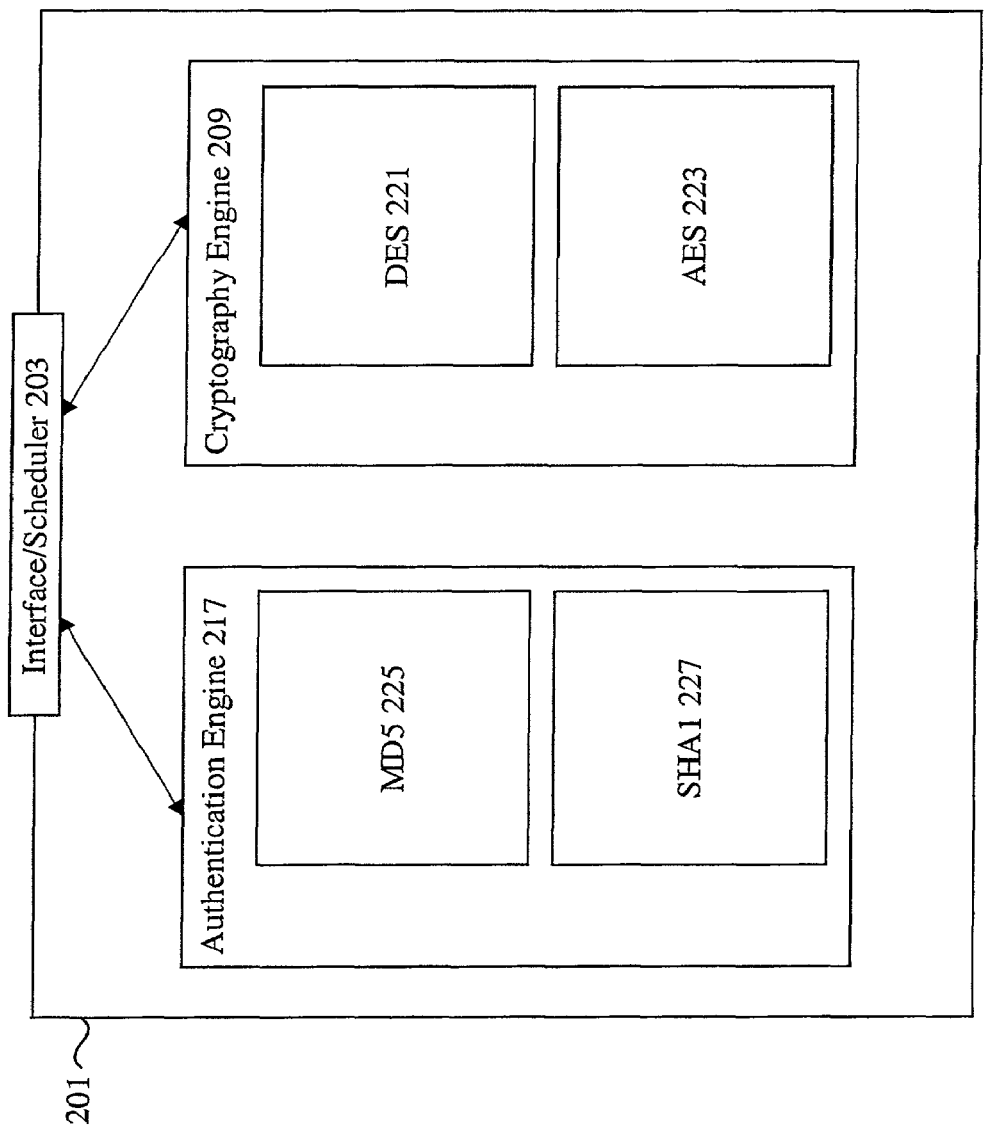
FIG. 2 is a diagrammatic representation of an integrated circuit containing processing cores for performing authentication and cryptography operations.

FIG. 2 is a diagrammatic representation of one example of a cryptography accelerator 201. The cryptography accelerator 201 includes an interface 203 connected to a host such as an external processor. According to various embodiments, the interface 203 receives information from the host for processing and sends information to the host when processing is completed. In one example, encrypted data associated with an SSL exchange is received through the interface. The interface 203 includes a scheduler for determining whether to send data blocks to various processing engines such as authentication engine 217 and cryptography engine 209. In one embodiment, encryption engine 209 includes components such as a DES engine 221 and an AES engine 223. An authentication engine 217 includes components such as MD5 engine 225 and SHA1 engine 227. It should be noted that a cryptography accelerator 201 can include other components as well, such as a public key engine, key derivation units, or cores for performing other authentication and encryption algorithms.

According to various embodiments, components for performing operations such as XOR operations are also included in the cryptography accelerator. In one example, an XOR component is included in the authentication engine so that SHA-1 and MD5 processed data can be combined together.

According to various embodiments, the techniques of the present invention are used in a secured session. Any message exchange sequence between two parties using both authentication and encryption and common session information known to both parties is referred to herein as a secured session. In one example, a secured session is SSL session. A secured session typically includes a handshake phase and a data exchange phase. A handshake phase often includes a key exchange sequence establishing common information, such as a shared key, for the transmission of data during the data exchange phase between two parties. Any mechanism involving exchanging information to establish a secured session between two entities is referred to herein as a handshake phase. According to various embodiments, the techniques of the present invention apply to the handshake phase.

Figure 3:
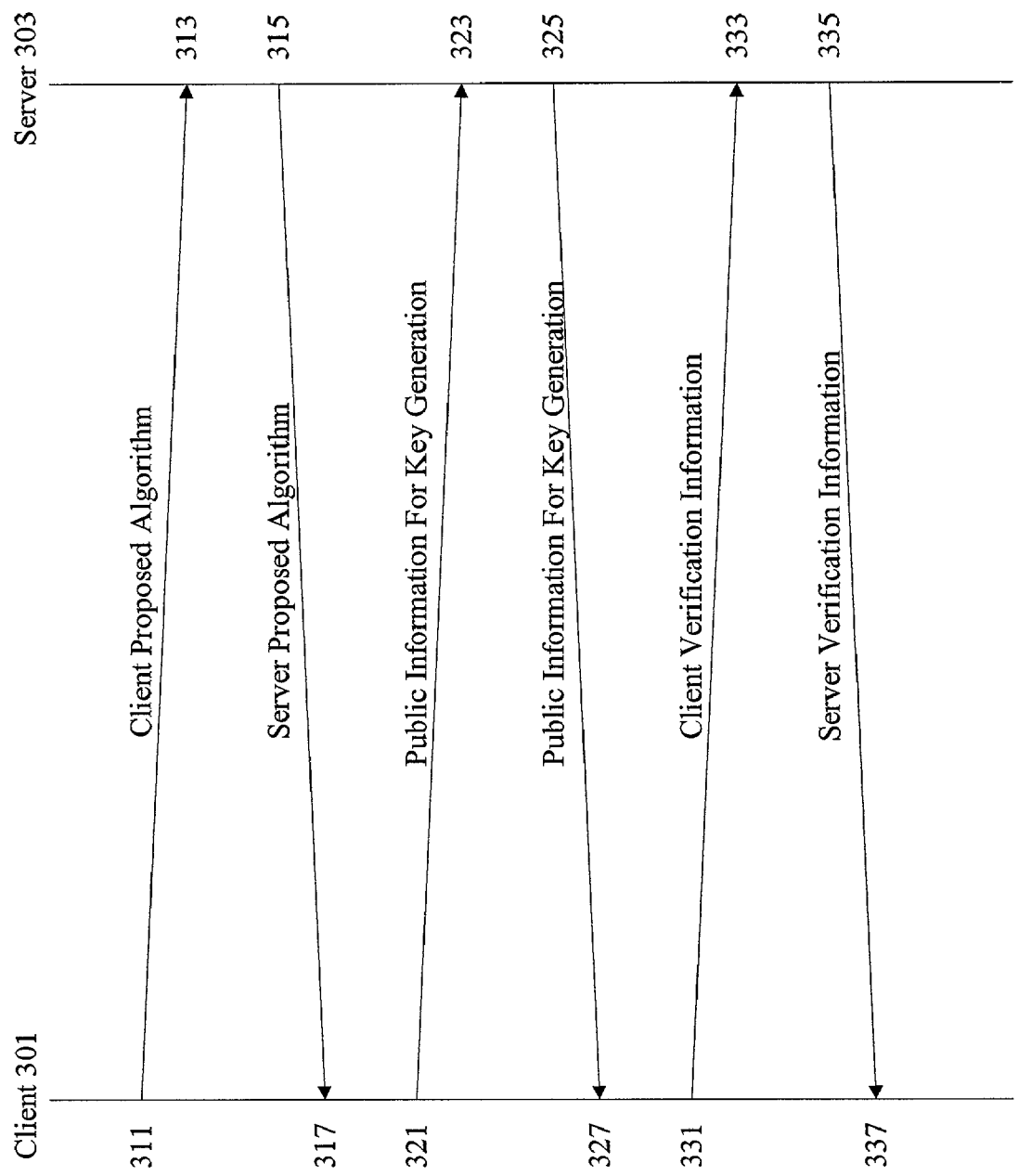
FIG. 3 is an interaction diagram showing a sequence in which the techniques of the present invention can be applied.

FIG. 3 is a transaction diagram showing one example of a handshake phase associated with SSL. Although the techniques of the present invention can be used in any context where a host calls a cryptographic accelerator, SSL will be described as one specific example in which the techniques of the present invention can be applied.

FIG. 3 is a transaction diagram showing one example of a handshake phase associated with SSL. A wide variety of sequences associated with handshake phases are available. At 311, the client 301 transmits a message with a security enable parameter to a server 303. In one embodiment, the authentication message contains an identifier such as a user name or an authentication identifier that allows the receiver to select an authentication mechanism out of a possible set of mechanisms. In another embodiment, the client sends an SSL version number, cipher settings, and client random information to the server 303. Server 303 may or may not already have information associated with the client. The server 303 identifies the security enable parameter along with any client proposed algorithms and proposes algorithms for encryption, for authentication, and for exchange or agreement of the cryptographic keys.

According to various embodiments, the server sends the server's own SSL version number, cipher settings, and server random information to the client 301. In one embodiment, the server also sends its certificate. A certificate may be a hash of a combined public key and identifier associated with the server encrypted with a trusted third party key. If the client is requesting a server resource that requires client authentication, the server at this point can also request that the client provide a certificate along with a digital signature. According to other embodiments, protocol version, session ID, cipher suite, and compression method are exchanged along with client random information and server random information.

At 317, client 301 uses the information sent by the server to authenticate the server. The client then generates a pre-master secret for the session, encrypts the pre-master secret with the server's public key obtained from the server certificate, and sends the encrypted pre-master secret to the server at 321. In one embodiment, the client computes a pre-master secret using cryptographic hardware to generate a random number. Information such as a pre-master secret or a client random sequence used to derive session keys is referred to herein as key generation information. In one example, a pre-master secret is used by both the server and the client to derive a master secret which is then used subsequently to derive session keys. Any intermediate information used to derive session keys from key generation information is referred to herein as master secret information.

According to various embodiments, master secret information is not transmitted over the network during a handshake phase but is instead derived independently by both a client entity and a server entity. If the server requested client authentication, the client signs a piece of data that is unique to this handshake and known by both the client and server and sends both the signed information and the client's own certificate to the server. According to various embodiments, the client signs a piece of data unique to the handshake by performing a hash.

According to various embodiments, the server 303 at 325 attempts to authenticate the client if client authentication was requested. If the client can not be authenticated, the session is terminated. If the client can be authenticated, the server 303 uses the key generation information from the client to generate session keys. In one example, the server 303 uses its private key to decrypt the pre-master secret. Both the server 303 and the client 301 use key generation information such as the pre-master secret to generate a master secret and subsequently to generate the session keys. In typical implementations, a function call is issued to a cryptography accelerator to derive a master secret from a pre-master secret. According to various embodiments, the function call parameters include protocol information and key generation information such as the pre-master secret, client random number, and server random number exchanged during the handshake.

The cryptography accelerator sends back a master secret. According to various embodiments, the cryptography accelerator sends the master secret back to a CPU running SSL software. The techniques of the present invention recognize that the master secret is not information that the CPU needs at this point. Instead of consuming valuable system resources such as bus, memory, and interface resources, the techniques of the present invention contemplate not sending the master secret back to the CPU. In typical implementations, the CPU stores the master secret and then performs context processing in order to provide protocol information to a cryptography accelerator to determine session keys. The CPU then sends the master secret along with processed protocol information to the cryptography accelerator.

The cryptography accelerator then generates the session keys. At 327, the session keys generated at both the client and the server are used to establish the secure session. According to various embodiments, cryptography accelerators associated with both client 301 and server 303 derive keys based on the selected algorithm or algorithms. According to various embodiments, the session keys can be used for communications between client 301 and server 303. It should be noted that a variety of different authentication sequences and communication sequences in general can use the techniques of the present invention. For example, only a single session key may be generated in some instances.

At 331, client 301 sends handshake information to the server 303. Any information transmitted for determining that the session keys generated at the server and the session keys generated at the client are the same set of keys is referred to herein as handshake information or verification information. In one example, a server 303 receives from the client 301 handshake information including a hash of the session keys combined with other key generation information. The server 303 then calculates client verification information using the session keys it generated. If the handshake information corresponds with the client verification information generated at the server, verification is completed. Information generated by the server for comparison with handshake information sent from the client to determine that the client has the correct set of session keys is referred to herein as handshake information, client verification information, or client finished information.

At 333, the server typically decrypts any message associated with client verification information received from the client entity 301 and compares the decrypted message with the generated client verification information to determine that the client verification information matches. The server then typically issues a function call to a cryptography accelerator to generate a server verification message.

Information generated by a server and sent to a client to determine that the server has the correct set of session keys is referred to herein as handshake information, server verification information or server finished information. In one example, the server CPU sends handshake information received from the client and client verification information to a cryptography accelerator that computes the server verification information. It should be noted that padding as well as other context information may be included in a variety of function calls and computations even if it is not explicitly stated.

It should be noted that in the above implementation, a master secret is never transmitted over the network. Instead, both network entities use derivatives of the pre-master secret to generate the session keys and other cryptographic information used for secure transmission. Both the master secret and the session keys need not ever be transmitted over the network.

According to various embodiments, the techniques of the present invention increase the efficiency of data transfer when using a cryptography accelerator system. Bus traffic and resource usage is reduced. It is contemplated that a cryptography accelerator can be used in any network entity including client and server entities. It should be noted that the authentication sequence shown in FIG. 3 is only one example of a sequence that can use the mechanisms and techniques of the present invention.

During a cryptography sequence such as that shown in FIG. 3, a host such as a CPU typically sends data to a cryptography accelerator for processing and receives processed data. According to various embodiments, the host and the cryptography accelerator share access to a system memory and the host sends and receives the data to a cryptography accelerator by writing and reading data in a buffer pool in system memory. In one embodiment, the host and the cryptography accelerator share usage of a virtual address space. Any memory that can be read and written by both the host and the cryptography accelerator is referred to herein as a system memory.

In a system with multiple devices, a system memory is often partitioned into multiple buffer pools associated with the various devices, applications, etc. Some buffer pools may be used as network buffers for various network devices such as wide area network and local area networks interface cards. When a host receives processed data from a cryptography accelerator, the processed data is generally written into a buffer pool associated with the host. In some examples, the processed data is written into kernel memory or application memory. In order to provide the data to another device such as a network card for transmission over a TCP/IP network, for example, the host reformats the processed data up from the cryptography accelerator and separates out the processed data into segments for packets.

Header information is added to the segments and other processing information such as checksum calculations is also inserted into the packets. The packets are then copied from kernel memory or application memory to a buffer pool associated with a network device such as a network card.

However, the transfer of processed data from a cryptography accelerator to kernel memory for processing and the subsequent transfer of packets from the kernel memory to the network buffer for the buffer pool associated with the network device is inefficient. In one aspect, the copying from one buffer pool to another buffer pool in system memory can significantly decreased system performance particularly one memory is scarce and cache misses are frequent. The host first issues a read request for a specific block of data associated with a packet and if the data is not in cache, a cache miss results and the host then typically must obtain the data from a source slower than cache. To write the specific block of data, the host issues a write request to make sure it has exclusive or owned access to a cache block or a system memory block. Frequent reads and writes are inefficient. Furthermore, the host reads data in the packet payload multiple times not only because of the read and write requests for copying the data to a different buffer pool, but also to calculate checksum information.

According to various embodiments, the techniques of the present invention provide zero copy data transfer from a cryptography accelerator to a variety of different classes of memory. According to various embodiments, the cryptography accelerator writes processed data directly to where the data is needed. In one example, the cryptography accelerator writes processed data directly to network buffers in a format that is substantially ready for transmission over a network. The techniques of the present invention allow the cryptography accelerator to write processed data to buffer pools associated with page memory, network buffers, DMA memory, and kernel memory. According to various embodiments, the need for a hosted to perform additional processing, reread processed data, or copy processed data from one buffer pool to another buffer pool is reduced or eliminated.

Figure 4:
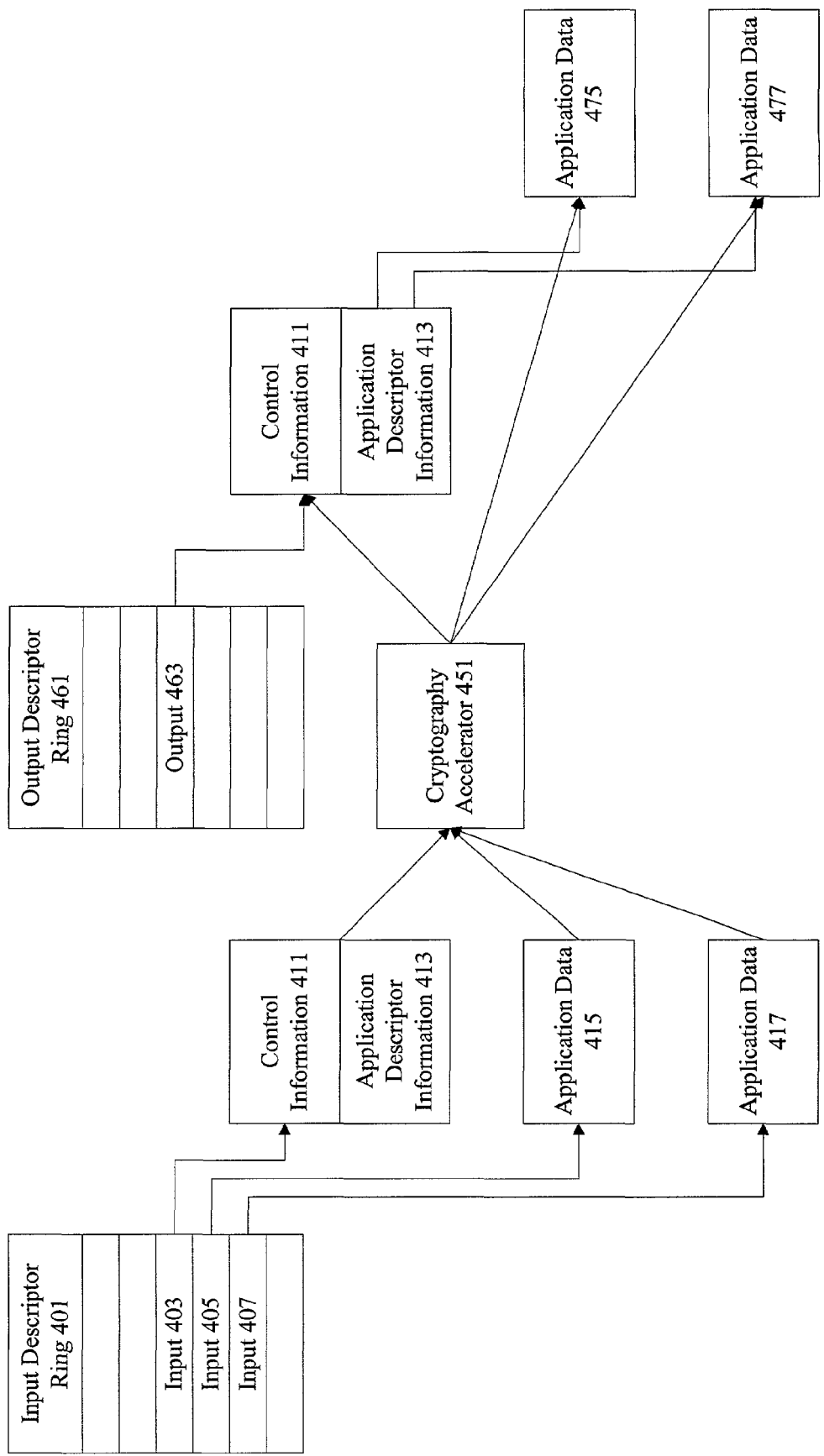
FIG. 4 is a diagrammatic representation of buffer pools associated with a cryptography accelerator.

FIG. 4 is a diagrammatic representation showing one example of buffer management associated with a cryptography accelerator. According to various embodiments, a cryptography accelerator 451 is associated with one or more input descriptor rings 401. In one embodiment, one descriptor ring is associated with a particular cryptographic processing channel. Multiple input descriptors 403, 405, and 407 are associated with input data. The input data identifies control information 411 and application data 415 and 417 for a cryptography accelerator 451. The cryptography accelerator 451 uses the control information 411 to determine how to process the application data 415 and 417. The input descriptors also identify application descriptor information 413.

Any information that identifies where data processed by the cryptography accelerator should be output is referred to herein as application descriptor information. According to various embodiments, the application descriptor information 413 includes system memory addresses and offsets. In typical implementations, a cryptography accelerator 451 writes output information to a buffer pool and corresponding to input buffer pool from which the information was obtained. In one example, if the cryptography accelerator 451 read data from kernel memory, the cryptography accelerator 451 would write processed data also to kernel memory.

The techniques of the present invention allow a cryptography accelerator 451 to write processed application data 475 and 477 directly to destination locations, such as a buffer pool associated with a network card. An output descriptor 463 in an output descriptor ring 461 references the control information 411 and the application descriptor information 413. The application descriptor information 413 provides information on where application data 475 and 477 are written.

Figure 5:
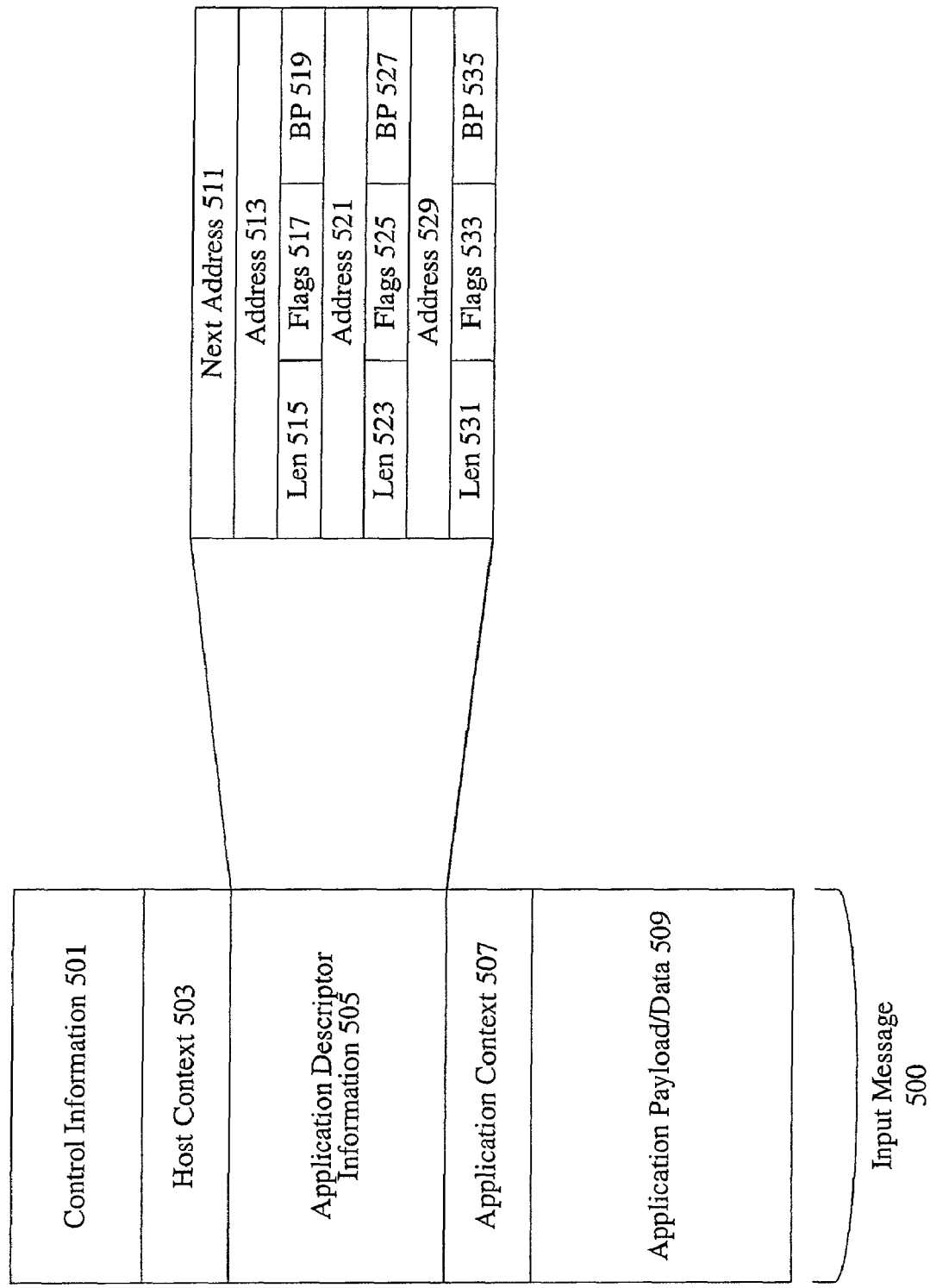
FIG. 5 is a diagrammatic representation of data a host sends to a cryptography accelerator.

FIG. 5 is a diagrammatic representation showing one example of an input message for a cryptography accelerator. The input message 500 includes control information 501, flags, and tag information to the cryptography accelerator. The input message 500 also includes a host context 503 and an application context 507. According to various embodiments, the host context 503 and application context 507 are copied unchanged to the output control information, and are used by software for any convenient purpose. Application payload/data 509 identifies information for the cryptography accelerator to process. The processing may include encryption, decryption, authentication, key derivation, verification, etc. The application descriptor information 505 includes addresses identifying where processed information should be written. According to various embodiments, the application descriptor information 505 includes system memory addresses 513, 521, and 529 as well as references from the above noted addresses. Flags 517, 525, and 533 provide information to the cryptography accelerator on the format in which the processed data should be written. It should be noted that a variety of formats for input messages can be used. In one example, application descriptor information 505 may include only address and offset information.

Figure 6:
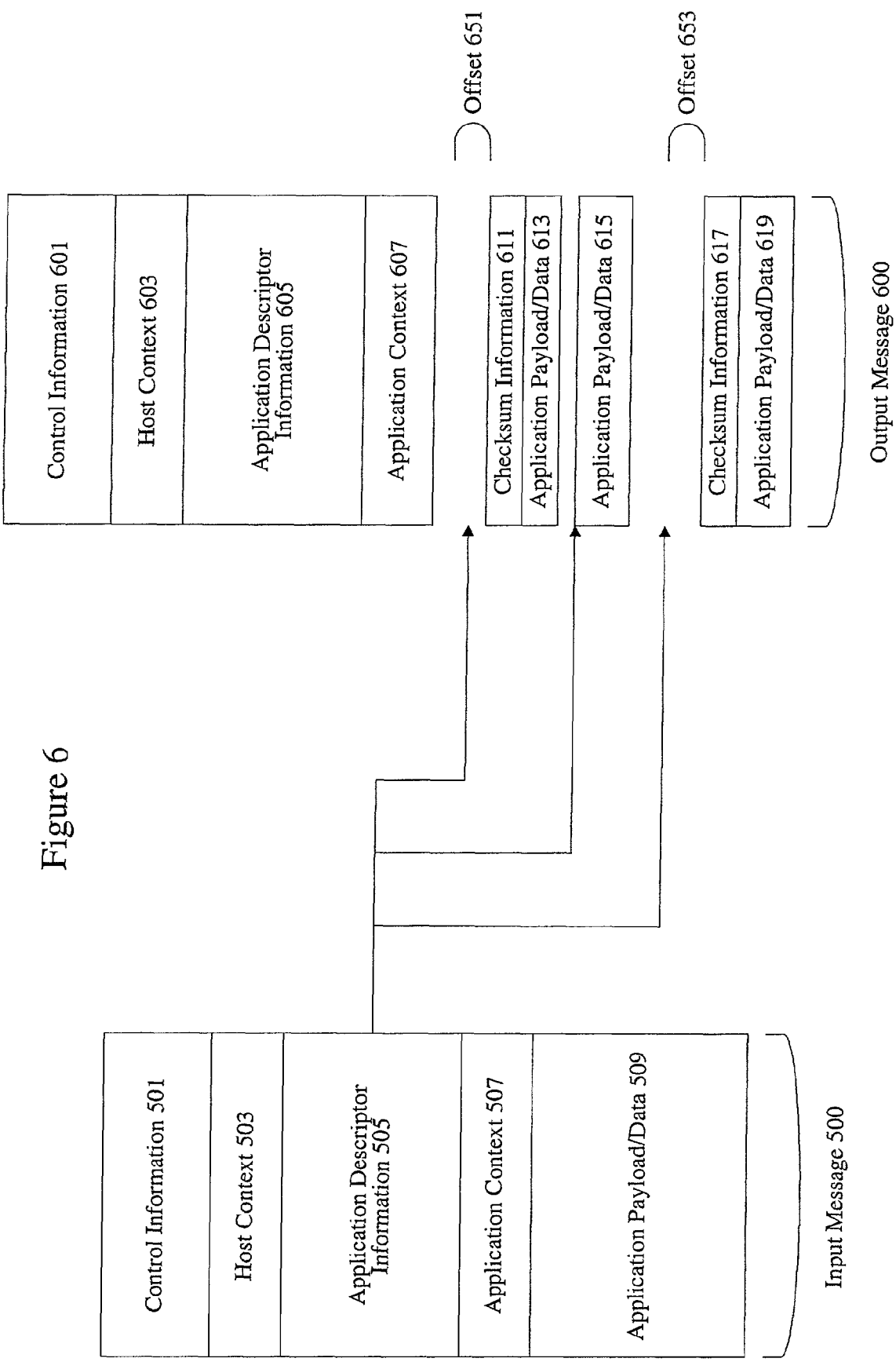
FIG. 6 is a diagrammatic representation of data output by a cryptography accelerator.

FIG. 6 is a diagrammatic representation showing one example of how an output message 600 is written. According to various embodiments, the application descriptor information 505 identifies offsets 651 and 653 for writing process data. In one example, the offsets 651 and 653 remain unwritten so that a host may write additional information such as a TCP/IP header into the offset location. The offset allows the host to ensure that a gap is placed at the beginning of the segment so that a header can be built in the same buffer pool without copying or recopying the data. The application descriptor information in the output message can be updated by the cryptographic accelerator to indicate characteristics of the output data, for example, lengths.

Many network protocols, and TCP/IP in particular, include a checksum over each message segment in order to detect certain transmission errors. In typical implementations, host software calculates checksum information by rereading the data that has been processed by a cryptography accelerator and performing various operations on that data, such as treating it as a sequence of 16-bit integers and performing adds and ones complements to accumulate the checksum.

To increase efficiency by reducing the need for a host to reread the data, a cryptography accelerator can calculate checksum information as the data is being written to a buffer pool such as a network buffer. In the preferred embodiment, the cryptographic accelerator returns checksum information 611 and 617 with each complete output segment (one segment including application payload/data 613 and 615, and another 619, respectively). In one example, the checksum information is a checksum that will be transmitted over a network. In another example, the checksum information is partial checksum information that is modified by a host after the header information is appended to the segment. According to various embodiments, the host reads the partial checksum information provided by the cryptographic accelerator, calculates additional checksum information after writing header information into the network buffer, and updates the checksum information in the header so that the checksum information reflects the contents of the entire packet.

Figure 7:
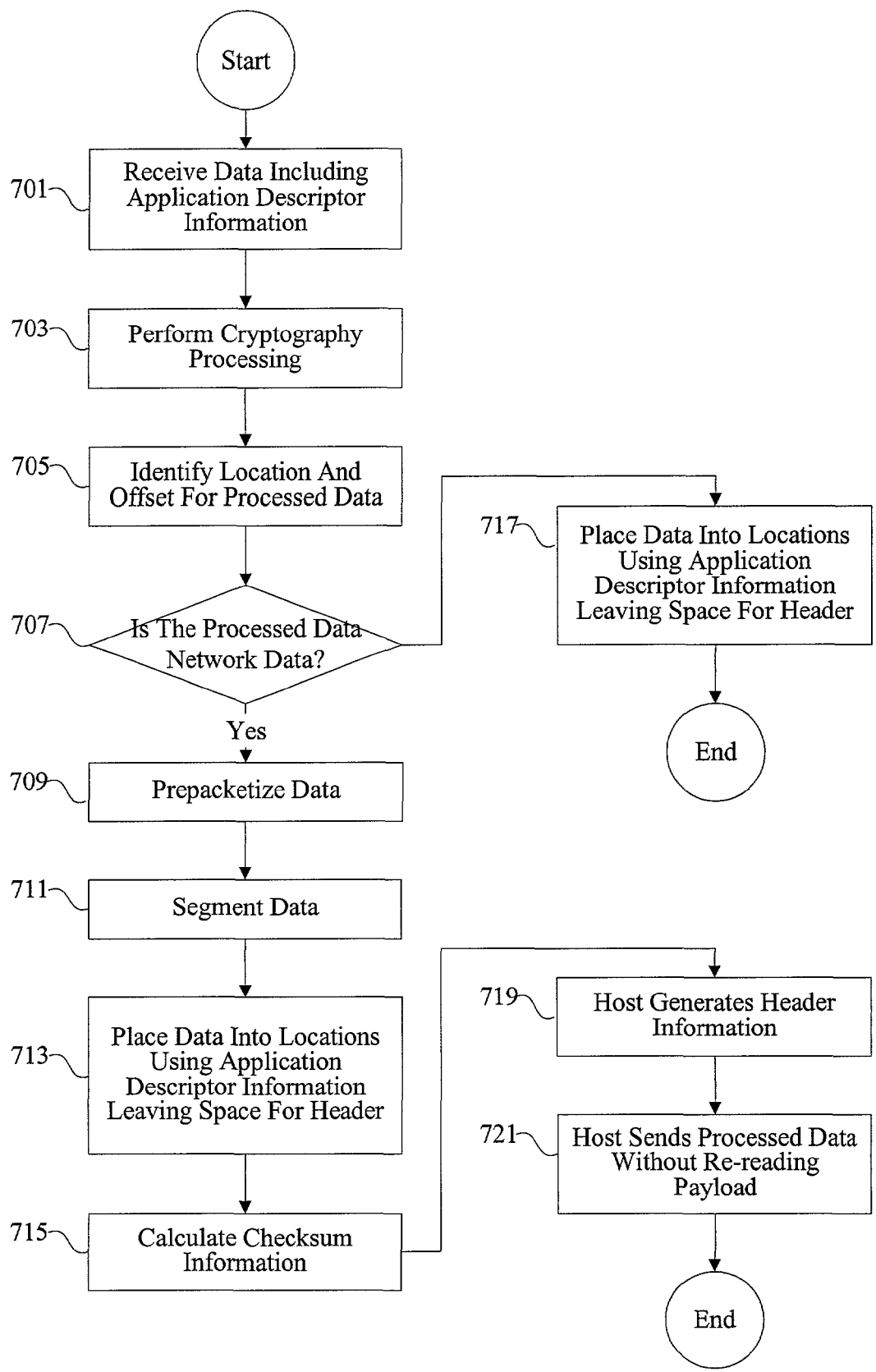
FIG. 7 is a flow process diagram showing a technique for data transfer in a cryptography accelerator system.

FIG. 7 is a flow process diagram showing techniques for transferring data. At 701, the cryptography accelerator receives data including application descriptor information. At 703, cryptography processing is performed. At 705, location and offset information for processed data placement is identified. According to various embodiments, location and offset information for one or more output segments is provided in the application descriptor information from a CPU. At 707, the cryptography accelerator determines if the processed data is network data. If the processed data it is network data for transmission onto a network, at 709 the data is packetized according to a particular format for network transmission. It should be noted that both plain text and cipher text data can be packetized. In typical implementations, the cryptography accelerator does not packetize data and instead merely sends the data back to a host such as a CPU. The host then performs processing on the data and packetizes and segments the data.

According to various embodiments, the cryptography accelerator more efficiently packetizes the data and segments the data at 711. By prepacketizing the data and segmenting the data, the host does not have to read and copy the processed data before the data can be transmitted over the network. At 713, a segmented data is placed into system memory locations using the application descriptor information. According to various embodiments, space is left for header information. In one embodiment, the data is received from a first buffer pool and processed data is written to a second buffer pool in system memory. In one particular example, the second buffer pool is associated with a network device. At 715, checksum information is calculated. Checksum information is calculated so that the host does not have to rescan the data or reread the segments in order to determine checksum information. Instead a network device can simply transmit the packets with the checksum information provided by the cryptography accelerator or checksum information can be calculated after the host adds a header into the packet using partial checksum information.

Checksum information referencing the payload of a packet used to calculate final checksum information referencing both the payload and the header is referred to herein as partial checksum information. According to various embodiments, the cryptography accelerator calculates partial checksum information and the host calculates final checksum information. At 719, a host generates header information without having to read the payloads. According to various embodiments, the headers are inserted into the locations maintained by the offsets in the application descriptor information. At 721, the host sends the processed data without rereading the payload. In one example, the network card transmits the packet without multiple scans of the processed data.

According to other embodiments, if it is determined that the processed data is not network data, the processed data does not necessarily have to be packetized or segmented. In one example, the data is merely placed into locations using application descriptor information. Space may or may not be left for header information.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method for transferring data in a cryptography accelerator system, the method comprising:

reading an input message at a cryptography accelerator from a host coupled to the cryptography accelerator and a network device, the input message comprising data and application descriptor information, wherein the cryptography accelerator, the network device, and the host are operable to access a plurality of types of shared memory and wherein the application descriptor information identifies an address within a type of shared memory of the plurality of types of shared memory and a format for writing processed data to the type of shared memory associated with the identified address;

performing cryptographic operations on the data to derive processed data;

separating the processed data into a plurality of segments;

directly writing the plurality of segments to the identified address and in the format identified by the application descriptor information in the input message.

2. The method of claim 1, wherein the network device is a network card.

3. The method of claim 2, wherein application descriptor information comprises output offset information.

4. The method of claim 3, wherein application descriptor information comprises output offset information for each of the plurality of segments, wherein the offset information for a segment indicates the size of a gap prior to the start of the associated segment.

5. The method of claim 4, wherein writing the plurality of segments comprises leaving the gap determined by the corresponding offset information before each of the plurality of segments for a plurality of headers.

6. The method of claim 5, wherein writing the plurality of segments comprises precalculating checksum information so that a host does not need to generate the checksum information.

7. The method of claim 6, wherein the checksum information is partial checksum information used by the host to generate a TCP/IP checksum.

8. The method of claim 2, wherein the plurality of segments correspond to a plurality of payloads in a plurality of network packets.

9. The method of claim 8, wherein the host adds header information to each of the network packets.

10. The method of claim 9, wherein the host is a CPU.

11. The method of claim 10, wherein the plurality of packets are transmitted without the host having to reread the payload.

12. The method of claim 11, wherein the type of shared memory associated with the identified address is a network buffer.

13. The method of claim 11, wherein the type of shared memory associated with the identified address is page memory.

14. The method of claim 11, wherein the type of shared memory associated with the identified address is DMA memory.

15. The method of claim 11, wherein the type of shared memory associated with the identified address is kernel memory.

16. A system for performing cryptographic operations in a network, the system comprising:

a network device operable to transmit a packet including cryptographically processed data onto the network;

a plurality of types of memory shared among the host, the network device, and a cryptography accelerator;

a host coupled to system memory, the host configured to provide application descriptor information and data for cryptography processing, wherein the application descriptor information provided by the host identifies an address within a type of shared memory of the plurality of types of shared memory and a format for writing processed data to the type of shared memory associated with the identified address;

a cryptography accelerator configured to directly write cryptographically processed data into one of the plurality of types of memory at the identified address and in the format identified by the application descriptor information;

wherein the packet comprises a payload substantially written by the cryptography accelerator and header substantially written by the host.

17. The system of claim 16, wherein the host is a CPU.

18. The system of claim 17, wherein the network device transmits a plurality of packets including cryptographically processed data.

19. The system of claim 18, wherein the network device is a network card.

20. The system of claim 19, wherein the type of shared memory associated with the identified address is a network buffer.

21. The system of claim 16, wherein the cryptography accelerator is further configured to calculate checksum information.

22. The system of claim 21, wherein the cryptography accelerator is further configured to separate the processed data into a plurality of segments.

23. The system of claim 22, wherein the plurality of segments are written as the payloads of a plurality of packets.

24. A cryptography accelerator configured to receive application descriptor information and data from a central processing unit over a system bus, the application descriptor information identifying an address within a type of shared memory of the plurality of types of shared memory and a format for writing processed data to the identified type of shared memory associated with the identified address; wherein the cryptography accelerator is operable to perform cryptographic processing to derive processed data and is further operable to directly write segments of the processed data to the identified address and in a format identified by the received application descriptor information.

25. The cryptography accelerator of claim 24, wherein the segments correspond substantially to the payloads of a plurality of TCP/IP packets.

26. The cryptography accelerator of claim 25, wherein the central processing unit writes the headers of the plurality of TCP/IP packets.

27. The cryptography accelerator of claim 26, wherein the network device is a network card.

28. The cryptography accelerator of claim 27, wherein the type of shared memory associated with the identified address is a network buffer.

29. The cryptography accelerator of claim 24, wherein the cryptography accelerator is further configured to calculate checksum information.

30. The cryptography accelerator of claim 24, wherein the cryptography accelerator is further configured to separate the processed data into a plurality of segments.

31. The cryptography accelerator of claim 24, wherein the application descriptor information includes information for determining a plurality of memory locations to write the processed data.

32. An apparatus for transferring data in a cryptography accelerator system, the method comprising:
- means for reading an input message at a cryptography accelerator from a host coupled to the cryptography accelerator and a network device, the input message comprising data and application descriptor information, wherein the cryptography accelerator, the network device, and the host are operable to access a plurality of types of shared memory and wherein the application descriptor information identifies an address within a type of shared memory of the plurality of types of shared memory and a format for writing processed data to the type of shared memory associated with the identified address;
- means for performing cryptographic operations on the data to derive processed data;
- means for separating the processed data into a plurality of segments;
- means for directly writing the plurality of segments to the identified address and in a format identified by the application descriptor information.

33. The apparatus of claim 32, wherein the network device is a network card.

34. The apparatus of claim 33, wherein application descriptor information comprises output offset information.

35. The apparatus of claim 34, wherein application descriptor information comprises output offset information for each of the plurality of segments, wherein the offset information for a segment indicates the size of a gap prior to the start of the associated segment.

36. The apparatus of claim 35, wherein writing the plurality of segments comprises leaving the gap determined by the corresponding offset information before each of the plurality of segments for a plurality of headers.

37. The apparatus of claim 36, wherein writing the plurality of segments comprises precalculating checksum information so that a host does not need to generate the checksum information.

38. The apparatus of claim 37, wherein the checksum information is partial checksum information used by the host to generate a TCP/IP checksum.

39. The apparatus of claim 33, wherein the plurality of segments correspond to a plurality of payloads in a plurality of network packets.

* * * * *

UNITED STATES PATENT AND TRADEMARK OFFICE
CERTIFICATE OF CORRECTION

| | | |
|---|---|---|
| PATENT NO. | : 7,941,662 B2 | |
| APPLICATION NO. | : 10/161475 | |
| DATED | : May 10, 2011 | |
| INVENTOR(S) | : Tardo et al. | |

It is certified that error appears in the above-identified patent and that said Letters Patent is hereby corrected as shown below:

Column 12, line 40, please delete "data to the identified type of shared" and replace with --data to the type of shared--.

Signed and Sealed this
Ninth Day of August, 2011

David J. Kappos
*Director of the United States Patent and Trademark Office*